(12) United States Patent
Nemirovsky et al.

(10) Patent No.: US 11,775,284 B2
(45) Date of Patent: Oct. 3, 2023

(54) ELECTRONIC DEVICE AND CODE PATCHING METHOD

(71) Applicant: Cortina Access, Inc., San Jose, CA (US)

(72) Inventors: Aleksandr Nemirovsky, San Jose, CA (US); Jian-Jr Li, San Jose, CA (US); He Zhu, San Jose, CA (US)

(73) Assignee: REALTEK SINGAPORE PRIVATE LIMITED, New Taipei (TW)

( * ) Notice: Subject to any disclaimer, the term of this patent is extended or adjusted under 35 U.S.C. 154(b) by 0 days.

(21) Appl. No.: 17/585,748

(22) Filed: Jan. 27, 2022

(65) Prior Publication Data
US 2023/0236827 A1   Jul. 27, 2023

(51) Int. Cl.
*G06F 8/65* (2018.01)
*G06F 9/4401* (2018.01)
*G06F 8/71* (2018.01)

(52) U.S. Cl.
CPC .................. *G06F 8/66* (2013.01); *G06F 8/71* (2013.01); *G06F 9/4408* (2013.01)

(58) Field of Classification Search
CPC ....... G06F 8/60–66; G06F 8/71; G06F 9/4408
USPC .................................................. 717/168–178
See application file for complete search history.

(56) References Cited

U.S. PATENT DOCUMENTS

| 6,892,297 B1 * | 5/2005 | Aguilar ...................... G06F 8/65 713/1 |
| 9,880,856 B2 | 1/2018 | Akdemir et al. |
| 2014/0244991 A1 | 8/2014 | Akdemir et al. |
| 2017/0039053 A1 * | 2/2017 | Siluvainathan ....... G06F 9/4401 |
| 2017/0371803 A1 | 12/2017 | Zmudzinski |
| 2021/0319107 A1 * | 10/2021 | Dahiya .................. G06F 21/602 |

FOREIGN PATENT DOCUMENTS

| TW | 200741542 A | 11/2007 |
| WO | WO-0049495 A2 * | 8/2000 ............... G06F 8/66 |

OTHER PUBLICATIONS

Booting, Wikipedia, 2020, 17 pages, [retrieved on Jul. 31, 2023], Retrieved from the Internet: <URL:https://web.archive.org/web/20200602181536/https://en.wikipedia.org/wiki/Booting>.*

* cited by examiner

*Primary Examiner* — Geoffrey R St Leger
(74) *Attorney, Agent, or Firm* — McClure, Qualey & Rodack, LLP

(57) ABSTRACT

An electronic device and a code patching method are provided. The electronic device includes a processor, a read-only memory (ROM), and a one-time programmable (OTP) memory. The ROM stores a boot code, and the boot code includes at least one checkpoint code segment. The OTP memory stores at least one patch code. The processor executes the boot code and queries whether there is a corresponding patch code in the OTP memory when the checkpoint code segment is executed, and if yes, executes the corresponding patch code.

18 Claims, 4 Drawing Sheets

ELECTRONIC DEVICE AND CODE PATCHING METHOD

BACKGROUND

Technical Field

The instant disclosure relates to electronic devices, and in particular, refers to an electronic device and a code patching method.

Related Art

Currently, after being booted up and powered on, a system on chip first executes a boot procedure to initialize a hardware device and establish a mapping graph of a memory space, to set the software and hardware environment of the system to an appropriate state, so as to facilitate subsequent calls to the operating system core. For security reasons, codes of the boot procedure are stored in a read-only memory (ROM), to prevent the codes from being tampered with. However, if an error is found in a boot code after system on chips are manufactured, the system on chips need to be re-manufactured, which consumes a lot of time, money and other resources.

SUMMARY

An embodiment of the instant disclosure discloses an electronic device, including a processor, a primary ROM, and a supplementary ROM memory. The primary ROM stores a boot code, and the boot code includes at least one checkpoint code segment. The processor is coupled to the primary ROM and the supplementary ROM and configured to execute the boot code of the primary ROM to execute a boot procedure of the electronic device; when the at least one checkpoint code segment is executed by the processor in a boot procedure, checks whether a patch code corresponding to the executed checkpoint code segment exists in the supplementary ROM; and when the patch code corresponding to the executed checkpoint code segment exists in the supplementary ROM, executes the patch code.

An embodiment of the instant disclosure discloses a code patching method, performed by a processor in an electronic device. The code patching method includes: reading and loading a boot code stored in a primary ROM, to execute a boot procedure of the electronic device, wherein the boot code includes at least one checkpoint code segment; and checking whether a patch code corresponding to the executed checkpoint code segment exists in a supplementary ROM when the at least one checkpoint code segment is executed by the processor in the boot procedure; and executing the corresponding patch code in the supplementary ROM when the patch code corresponding to the executed checkpoint code segment exists in the supplementary ROM.

According to the electronic device and the code patching method in some embodiments of the instant disclosure, the boot code stored in the ROM can be patched, and especially, a code segment before a hardware initialization code segment can be patched.

DETAILED DESCRIPTION

Figure 1:
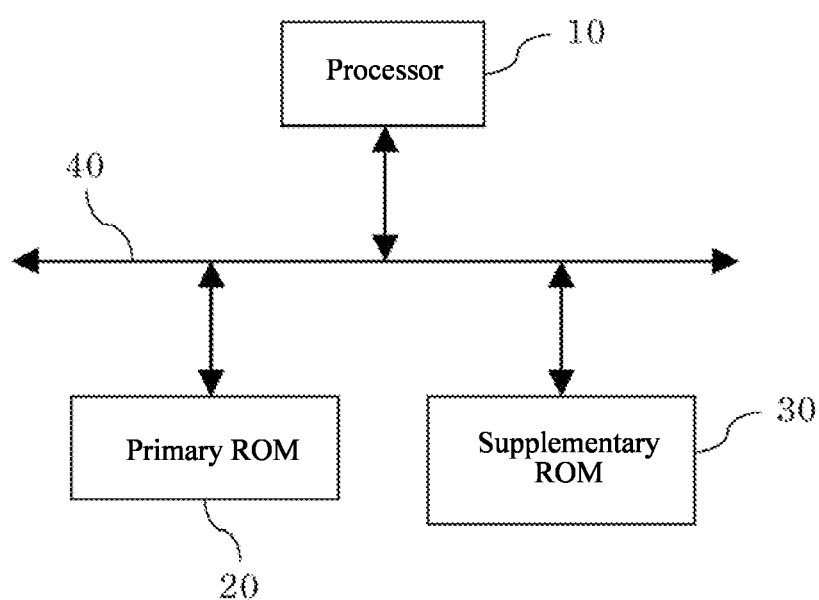
FIG. 1 is a schematic diagram of an electronic device according to an embodiment of the instant disclosure.

FIG. 1 is a schematic diagram of an electronic device according to an embodiment of the instant disclosure. The electronic device may be a system on chip (SOC) or an electronic device including the SOC. The electronic device includes: a processor 10, a primary ROM 20, a supplementary ROM 30, and a bus 40. The processor 10 is coupled to the primary ROM 20 and the supplementary ROM 30 through the bus 40. The primary ROM 20 stores a boot code. The boot code includes at least one checkpoint code segment. The supplementary ROM 30 is provided for storing at least one patch code. That is, a programmer can place the checkpoint code segment in one or more locations in the boot code. When the programmer finds that the boot code needs to be corrected, the programmer can write a patch code and stores the patch code into the supplementary ROM 30. The patch code is used for correcting part of code in the boot code. In other words, the supplementary ROM 30 and the boot code are set to coordinate with each other to be capable of executing the patch code that is subsequently stored in the supplementary ROM 30. That is, when the design of the electronic device is completed, the supplementary ROM 30 has not stored the patch code, but the boot code has included the checkpoint code segment to check whether a patch code exists in the supplementary ROM 30.

In some embodiments, the primary ROM 20 is a ROM.

In some embodiments, the supplementary ROM 30 is a one-time programmable (OTP) ROM.

In some embodiments, the processor 10, the primary ROM 20 and the supplementary ROM 30 are located within a system-on-chip (SOC).

Figure 2:
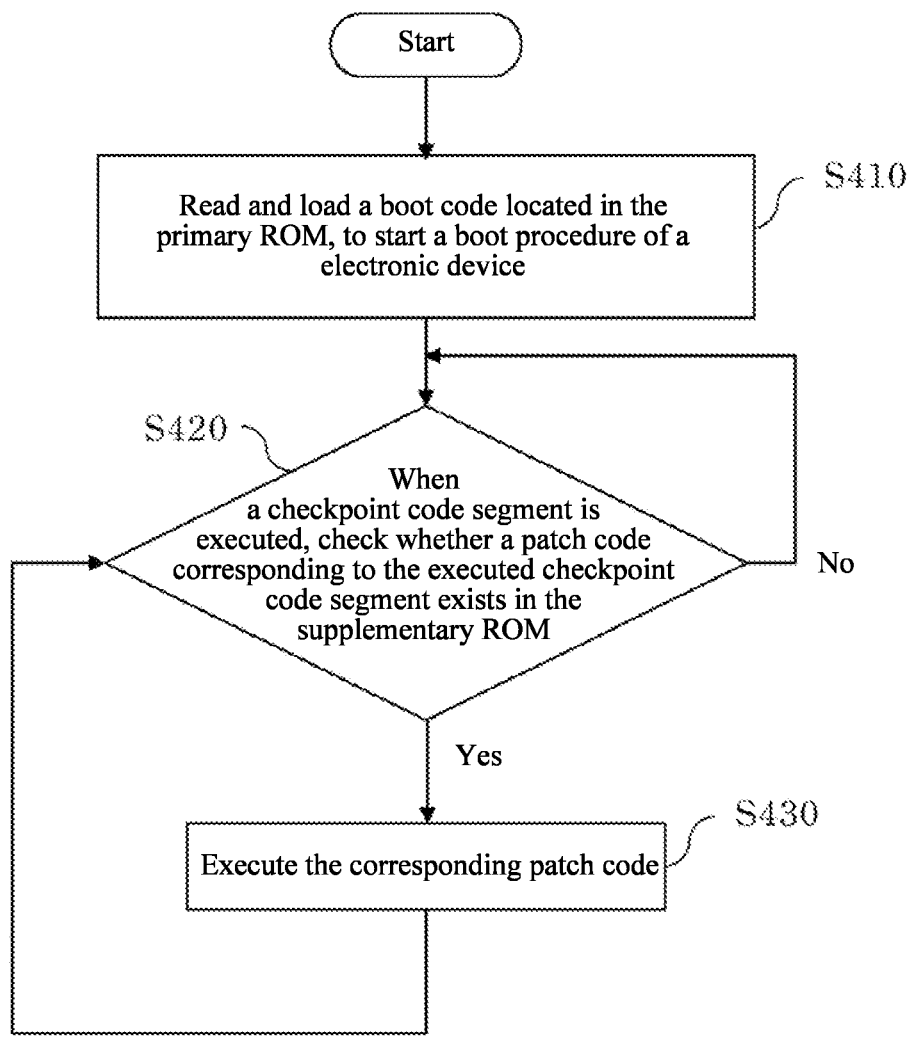
FIG. 2 is a flowchart of a code patching method according to an embodiment of the instant disclosure.

FIG. 2 is a flowchart of a code patching method according to an embodiment of the instant disclosure. The code patching method is performed by the processor 10. First, the processor 10 reads and loads a boot code stored in the primary ROM 20, to execute a boot procedure of an electronic device (step S410). In step S420, the processor 10 checks whether a patch code corresponding to the executed checkpoint code segment exists in the supplementary ROM 30 when the at least one checkpoint code segment is executed by the processor in the boot procedure. If yes (i.e., the patch code corresponding to the executed checkpoint code segment exists in the supplementary ROM 30), the processor 10 executes the corresponding patch code in the supplementary ROM 30 (step S430), and returns to continue to execute the boot code after executing the patch code. If not, the processor 10 continues to execute the boot code segment after the checkpoint code segment. In this way, an error code segment in the boot code stored in the primary ROM 20 can be patched (i.e., the error code segment is skipped without execution).

Figure 3:
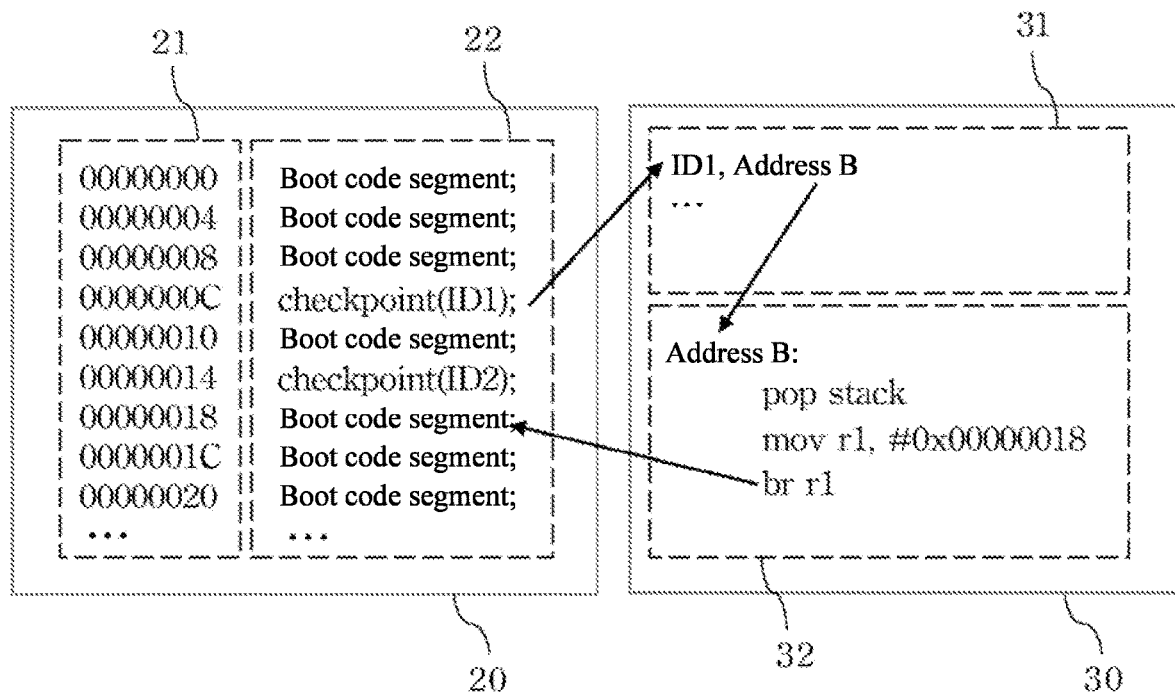
FIG. 3 is a schematic diagram of a code according to an embodiment of the instant disclosure.

FIG. 3 is a schematic diagram of a code according to an embodiment of the instant disclosure. In FIG. 3, an example of the boot code stored in the primary ROM 20 is given, and a code segment 22 at a storage address 21 of the primary ROM 20 is presented. The processor 10 executes the boot code from a start address (0000000 here) and down in sequence. When the first checkpoint code segment (checkpoint (ID1)) is executed, the processor 10 checks whether a corresponding patch code exists in the supplementary ROM 30. Specifically, the supplementary ROM 30 includes a first storage area 31 and a second storage area 32. A look-up table is stored in the first storage area, and the patch code is stored in the second storage area. The look-up table includes at least one first identifier and at least one corresponding first address. Here, "ID1" is taken as the first identifier for example, and an "address B" is taken as the first address for example. The first checkpoint code segment indicates that there is a second identifier (ID 1 here). Therefore, when finding the first identifier (ID 1 here) corresponding to the second identifier in the look-up table, the processor 10 obtains the first address (that is, the address B) corresponding to the first identifier. Next, the processor 10 executes the corresponding patch code (here, an example of extracting stacked data is given) at the first address (that is, the address B) of the supplementary ROM 30. The first address is located in the second storage area 32. The patch code comprises a return address (00000018 here) of the primary ROM 20, and a program counter is set to the return address, so that the processor 10 continues to execute the boot code located after the return address of the primary ROM 20. Therefore, the processor 10 can skip the error code segment in the boot code and continue the execution at the specified return address. For example, code segments at an address 00000010 and an address 00000014 are skipped here. That is, part of code in the boot code is skipped and not executed by the processor 10 according to the checkpoint code segment and the patch code. However, in the instant disclosure, it is not necessary to skip some code segments. After executing the patch code, the processor 10 may also return to a next address of the executed checkpoint code segment, to continue to execute the subsequent boot code.

Here, a code example of the foregoing checkpoint function is shown as follows, which is used for determining whether there is an address (a variable addr) corresponding to the second identifier in the supplementary ROM 30. If yes, the processor 10 obtains and jumps to the address corresponding to the second identifier for execution.

type status checkpoint(arg ID)

```
{
    address_type add;
    addr=search_supplementory_rom(ID);
    if(add!=NULL)
        jump(addr);
        return(OK);
    else
        return(NOT_FOUND);
}
```

An example of the search_supplementory_rom function listed before is shown as follows, which is used for searching whether there is a first identifier (a variable id_supplement) corresponding to a second identifier (a variable ID) in the first storage area 31 of the supplementary ROM 30 in which the look-up table is stored. If yes, the processor 10 returns to a first address (a variable addr) corresponding to the first identifier.

int search_supplementory_rom(arg ID)

```
{
    unit_32 id_supplement, addr=NULL;
    for(i=0; i<maxmun_checkpoint'i++) {
        get_id(id_supplement);
```

-continued

```
        if(ID== id_supplement) {
            addr=get_offset(id_supplement);
            return addr;
        }
    }
}
```

Figure 4:
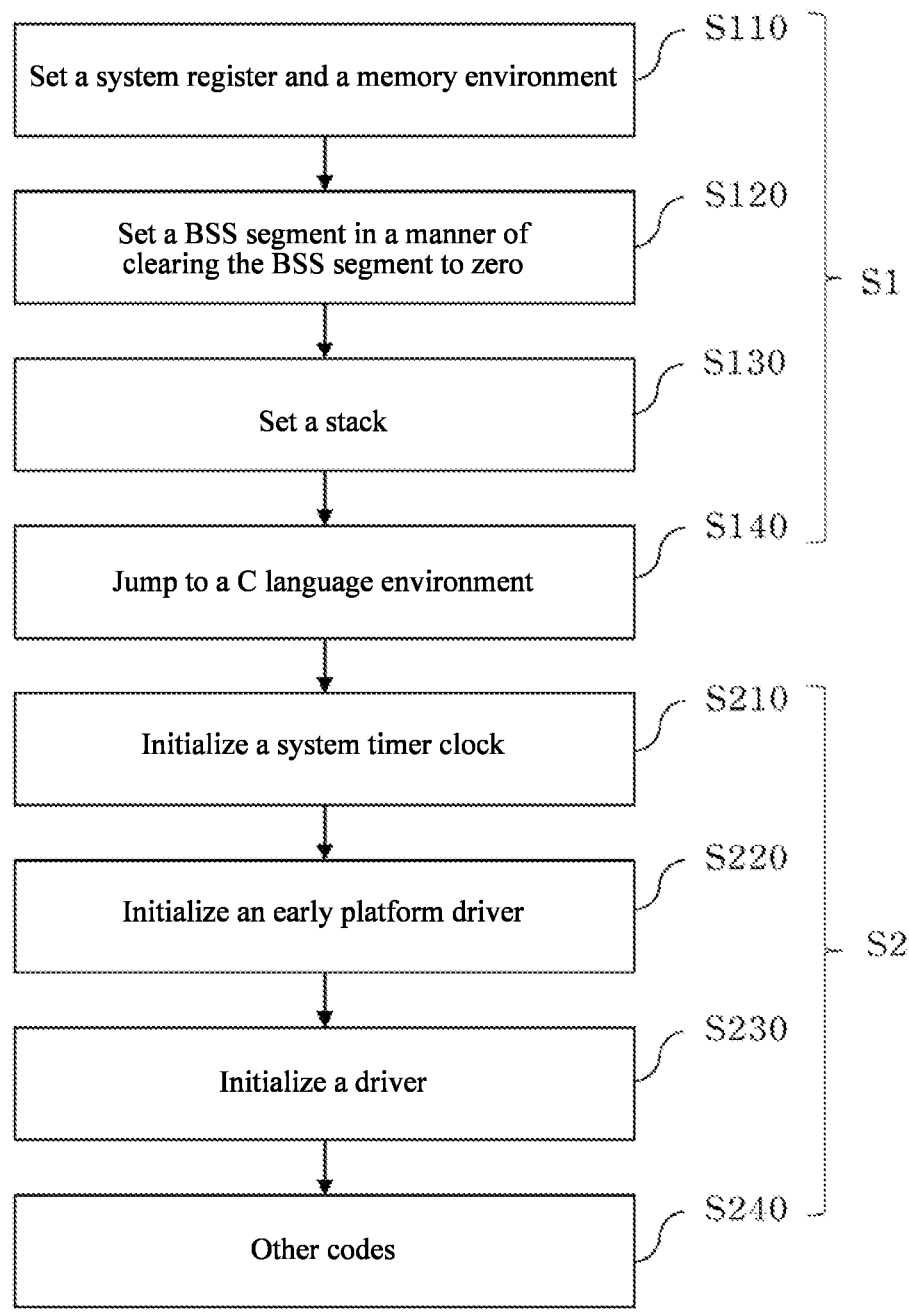
FIG. 4 is a flowchart of a boot procedure according to an embodiment of the instant disclosure.

FIG. 4 is a flowchart of a boot procedure according to an embodiment of the instant disclosure. The boot procedure is mainly divided into two stages. A first stage S1 includes step S110 to step S140, and a second stage S2 includes step S210 to step S240. The first stage S1 is implemented by assembly language, and the second stage S2 is implemented by C language. Step S110 is setting a system register and a memory environment. Step S120 is setting a block started by symbol (BSS) segment in a manner of clearing the BSS segment to zero. Step S130 is setting a stack. Step S140 is jumping to a C language environment and entering the second stage S2. Step S210 is initializing a system timer clock. Step S220 is initializing an early platform driver. Step S230 is initializing a driver, such as a universal asynchronous receiver/transmitter (UART), an interrupt controller, a watchdog, a flash memory, or an embedded multimedia card (eMMC). Step S240 is executing other codes. Here, it should be noted that, if the execution of the patch code located in the supplementary ROM 30 is triggered by an interrupt manner, it is required to wait until the initialization of the interrupt controller is completed in step S230. In other words, in this way, only a code segment after the initialization of the interrupt controller is completed can be patched, and a code segment before the initialization of the interrupt controller cannot be patched. However, the instant disclosure does not adopt the interrupt manner, and the code can be patched in step S210 and the subsequent steps. That is, the checkpoint code segment may be set before a hardware initialization code segment corresponding to step S230 (a hardware initialization step), and the patch code corresponding to the checkpoint code segment may be executed before the hardware initialization step is performed. In some embodiments, the checkpoint code segment may be set before an interrupt initialization code segment that is in the hardware initialization code segment. However, the instant disclosure does not limit that the checkpoint code segment needs to be set before the hardware initialization code segment, and the checkpoint code segment may be set after the hardware initialization code segment, which depends on actual needs.

In summary, according to the electronic device and the code patching method in some embodiments of the instant disclosure, the boot code stored in the primary ROM 20 can be patched, and especially, a code segment before the hardware initialization code segment can be patched.

What is claimed is:
1. An electronic device, comprising:
a primary read-only memory (ROM), storing a boot code which is unchangeable, the boot code comprising at least one checkpoint code segment;
a supplementary ROM; and
a processor, coupled to the primary ROM and the supplementary ROM, configured to execute the boot code of the primary ROM to execute a boot procedure of the electronic device; when the at least one checkpoint code segment is executed by the processor in a boot procedure, checking whether a patch code corresponding to the executed checkpoint code segment exists in the supplementary ROM; and when the patch code corresponding to the executed checkpoint code segment exists in the supplementary ROM, executing the patch code.

2. The electronic device according to claim 1, wherein the supplementary ROM stores a look-up table, the look-up table comprises at least one first identifier and at least one corresponding first address, each checkpoint code segment indicates that there is a second identifier, the processor checks whether there is the first identifier corresponding to the second identifier in the look-up table, and if yes, the processor executes the patch code from the first address that is of the supplementary ROM and that corresponds to the found first identifier.

3. The electronic device according to claim 2, wherein the supplementary ROM comprises a first storage area and a second storage area, wherein the look-up table is stored in the first storage area, and the patch code is stored in the second storage area.

4. The electronic device according to claim 1, wherein the patch code comprises a return address of the primary ROM, and the processor continues to execute the boot code located after the return address of the primary ROM.

5. The electronic device according to claim 1, wherein the boot code further comprises a hardware initialization code segment, wherein at least one checkpoint code segment executed by the processor is before the hardware initialization code segment executed by the processor.

6. The electronic device according to claim 5, wherein the hardware initialization code segment comprises an interrupt initialization code segment.

7. The electronic device according to claim 1, wherein the primary ROM, the supplementary ROM and the processor are located within a system-on-chip (SOC).

8. The electronic device according to claim 1, wherein part of code in the boot code is skipped and not executed by the processor according to the at least one checkpoint code segment and the patch code.

9. The electronic device according to claim 1, wherein the supplementary ROM is a one-time programmable (OTP) ROM.

10. A code patching method, performed by a processor in an electronic device, the code patching method comprising:
reading and loading a boot code stored in a primary read-only memory (ROM), to execute a boot procedure of the electronic device, wherein the boot code is unchangeable and comprises at least one checkpoint code segment;
checking whether a patch code corresponding to the executed checkpoint code segment exists in a supplementary ROM when the at least one checkpoint code segment is executed by the processor in the boot procedure; and
executing the corresponding patch code in the supplementary ROM when the patch code corresponding to the executed checkpoint code segment exists in the supplementary ROM.

11. The code patching method according to claim 10, wherein the supplementary ROM stores a look-up table, the look-up table comprises at least one first identifier and at least one corresponding first address, and each checkpoint code segment indicates that there is a second identifier, wherein the checking whether there is the patch code corresponding to the executed checkpoint code segment in the supplementary ROM is checking whether there is the first identifier corresponding to the second identifier in the look-up table, and if yes, the patch code is executed from the first address that is of the supplementary ROM and that corresponds to the found first identifier.

12. The code patching method according to claim 11, wherein the supplementary ROM comprises a first storage area and a second storage area, wherein the look-up table is stored in the first storage area, and the patch code is stored in the second storage area.

13. The code patching method according to claim 10, wherein the patch code comprises a return address of the primary ROM, and the code patching method further comprises:
continuing to execute the boot code located after the return address of the primary ROM after executing the patch code.

14. The code patching method according to claim 10, wherein the boot code further comprises a hardware initialization code segment, and the code patching method further comprises:
executing the hardware initialization code segment by the processor, wherein at least one checkpoint code segment executed by the processor is before the hardware initialization code segment executed by the processor.

15. The code patching method according to claim 14, wherein the hardware initialization code segment comprises an interrupt initialization code segment.

16. The code patching method according to claim 10, wherein the primary ROM, the supplementary ROM and the processor are located within a system-on-chip (SOC).

17. The code patching method according to claim 10, further comprising:
generating the patch code through compiling according to part of code to be corrected in the boot code; and
storing the patch code into the supplementary ROM, wherein the patch code is used for correcting the part of code in the boot code.

18. The code patching method according to claim 17, wherein the part of code to be corrected in the boot code is skipped by the processor according to the at least one checkpoint code segment and the patch code.

* * * * *